Nov. 6, 1951 W. F. KANNENBERG 2,573,713
ELECTRICAL WAVE GUIDE SWITCH
Filed Feb. 21, 1945 3 Sheets-Sheet 2

INVENTOR
W. F. KANNENBERG
BY
E. V. Griggs
ATTORNEY

Nov. 6, 1951  W. F. KANNENBERG  2,573,713
ELECTRICAL WAVE GUIDE SWITCH
Filed Feb. 21, 1945  3 Sheets-Sheet 3

INVENTOR
W. F. KANNENBERG
BY
E. V. Griggs
ATTORNEY

Patented Nov. 6, 1951

2,573,713

UNITED STATES PATENT OFFICE 2,573,713

ELECTRICAL WAVE GUIDE SWITCH

Walter F. Kannenberg, Lyndhurst, N. J., assignor to Bell Telephone Laboratories, Incorporated, New York, N. Y., a corporation of New York Application February 21, 1945, Serial No. 579,105

10 Claims. (Cl. 178—44)

This invention relates to switches for electrical wave guides.

An object of the invention is to provide wave guide switches which in one position will effectively preclude transmission through the wave guide and which in another position will permit transmission with substantially negligible attenuation or reflection.

Another object of the invention is to provide a wave guide switch which is compact and simple to construct.

Another object of the invention is to provide a wave guide switch which may connect a first wave guide alternately to a second wave guide or to a third wave guide at will.

An additional object of the invention is to prevent leakage of microwave energy past wave guide switches in consequence of minute crevices between the walls of the guide and the closure member of the switch.

In accordance with the invention a wave guide structure having a guide passageway therethrough includes a cylindrical rotatable member or one or more rotatable discs which serve, when rotated, to project into the guide passageway an interrupting element which may either effectively close the passageway physically or may divide it into a plurality of fractional passageways which are of too limited dimension to pass waves of the frequencies for which the structure is designed. The form of switch having a cylindrical rotatable member is designed to have the cylindrical axis of rotation transverse to the passageway. A 90-degree rotation of the cylindrical member closes the passageway at each side of the member and permits spring-pressed contactors to divide any residual crevice into fractional paths of too limited dimensions to permit leak of microwaves past the cylindrical switch member.

In the drawing Fig. 1 illustrates a microwave testing system which embodies one form of the invention;

Figure 1:
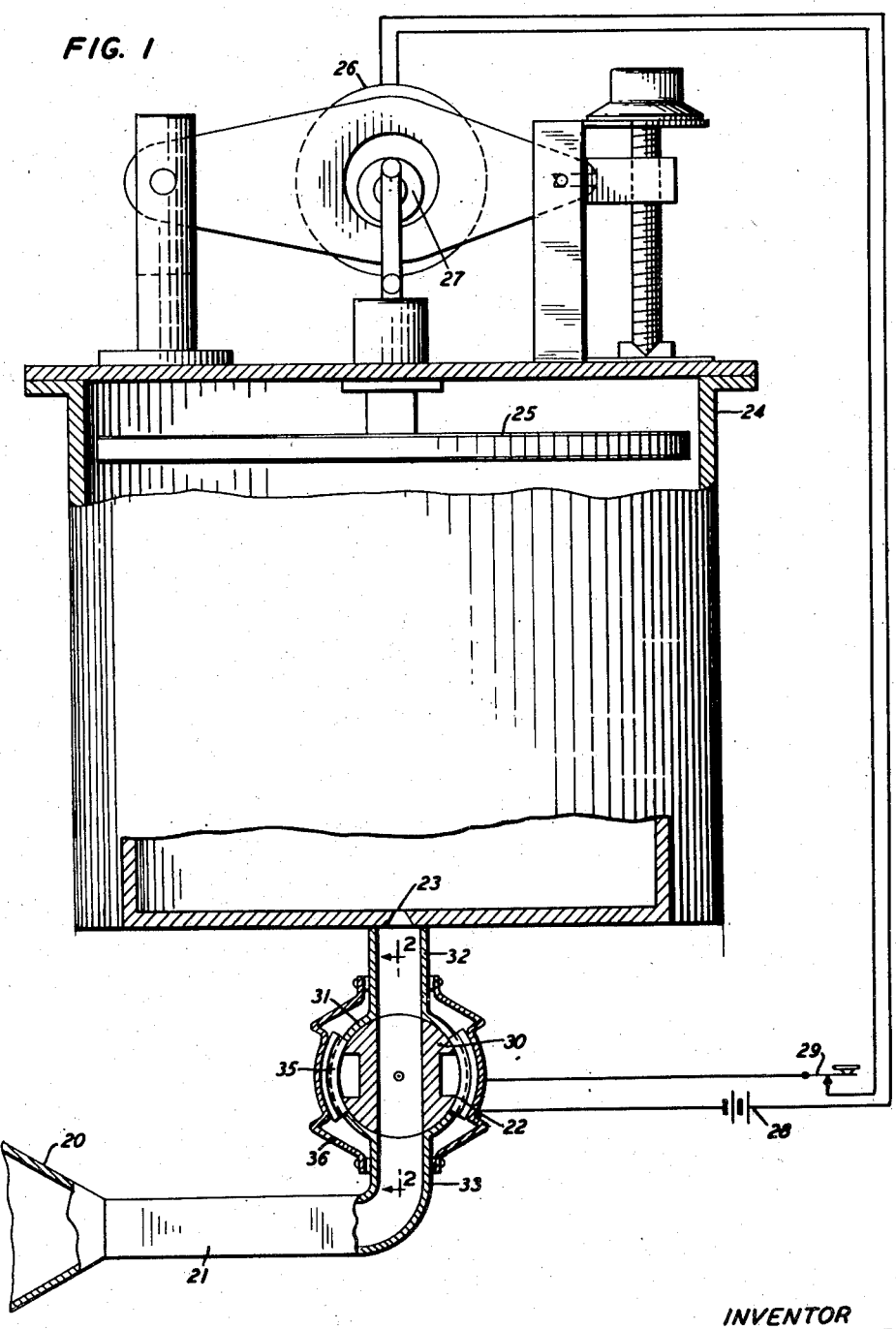

Referring to Fig. 1 there is shown a phantom target device involving a microwave pick-up horn 20 connected to a wave guide 21, which leads through a wave guide switch 22 to an aperture coupling 23 in the lower end of a cavity resonator 24. The aperture 23 is preferably located at a point in the lower end of the cavity resonator 24 which is about .48 of the radius since it is in that region that the circular electric vector of TE₀ mode oscillations for which the apparatus disclosed is intended is of maximum intensity. The cavity resonator is provided with a tuning piston 25 operated by a motor 26 and reciprocating mechanism 27 of the type disclosed and claimed in Kannenberg application Serial No. 544,990 filed July 14, 1944 for Testing System, now Patent No. 2,537,139, issued January 9, 1951. The motor 26 and the actuator of the wave guide switch 22 are connected in series with a source 28 through a key 29. In the closed position of the key the wave guide switch 22 is open as shown in Fig. 1 and the motor is in operation causing the piston 25 to vary the tuning of resonator 24 over a range of frequencies including that of the transmitter of a radio object locating system in connection with which the apparatus of Fig. 1 is intended to operate. A pulse of oscillation energy picked up by the horn 20 is guided to the interior of the resonator 24 to excite the resonator and upon cessation of the pulse the resonator 24 returns to the wave guide 21 and the horn 20 an outgoing train of decaying oscillations. The tuning cycle of the piston 25 is relatively slow compared to the period of duration of the incoming pulse and of reemission from the resonator 24 so that for any given incoming pulse the piston 25 may be considered as if fixed in position. Consequently, when the piston 25 is in the position at which a natural resonance frequency of the resonator 24 corresponds with the frequency of the oscillations of an incoming pulse, the resonator will be strongly excited and will return a relatively long train of oscillations to the receiving apparatus of the radio object locator. It is therefore possible to check up on the tuning of the object locator receiver and the over-all efficiency of the radio object locator by observing the duration of the oscillation train emitted by resonator 24 and received at the object locator receiver.

The wave guide switch 22 comprises a solid cylindrical rotor portion 30 mounted with its cylindrical axis transverse to the length of the wave guide within a closely fitting casing 31. The cylindrical axis is also parallel to the width or broader direction of the rectangular wave guide which determines the lower cut-off frequency of the guide. In such a structure the cylindrical rotor portion should be carefully aligned in its end bearings and should preferably have an extremely slight air-gap all around in order to avoid all friction other than bearing friction. Such devices are found to be reasonably satisfactory with a uniform air-gap or spacing of about 30 mils maximum. A smaller spacing simplifies the problem of preventing leakage of the oscillation energy but renders more difficult the mechanical problem of operating such switches with a minimum of power as is highly desirable in many applications as, for example, aircraft. In this specification and the appended claims the cylindrical rotor will be regarded as closely fitting into the cylindrical opening when the spacing is of the order of 30 mils maximum. A passageway through the rotor 30 is so designed as to conform exactly with that of the wave guide sections 32 and 33 when aligned with them in the open position of the switch. Any deviation from a perfect fit of the rotor 30 within the casing 31 results in a minute "crack" having a width equal to that of the wave guide section and extending around between the rotor 30 and the casing 31 from wave guide section 32 to section 33. A similar "crack" appears at the opposite side of the wave guide. In order to prevent leakage through these cracks particularly during those times when the switch 22 is in closed position, the switch is provided with arcuate contactors 35 projecting through slots in the casing 31 and constrained by springs 36 to bear lightly upon the rotor 30 thus dividing the infinitesimal cracks into subdivisions, the dimensions of which are insufficient to permit passage of the waves of those frequencies for which the system is designed. The "cracks" are, in effect, wave guides each having a width equal to that of the principal wave guide and having thicknesses which are infinitesimal. This width determines the cut-off frequency of the "cracks" as it does of the principal wave guide. With the "cracks" divided into subdivision wave guides each of the resulting or subdivision guides has a considerably smaller width and hence has a cut-off frequency so very much higher than that of the principal wave guide that it will not pass oscillations of the frequency for which the system is designed.

Figure 2:
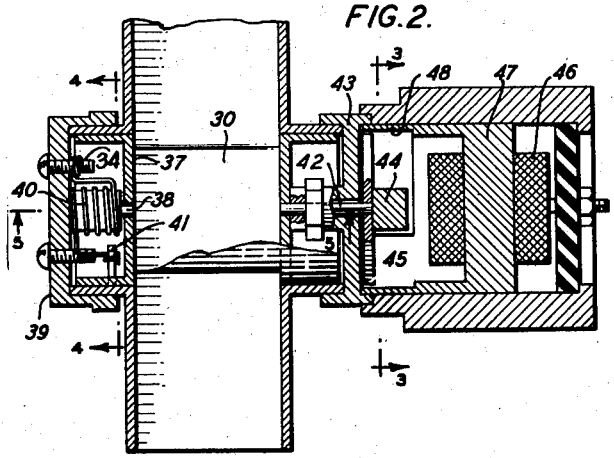
Fig. 2 is a vertical plane section of the wave guide switch of Fig. 1 along a plane passing through the line 2—2.

Fig. 2 illustrates the internal construction of the wave guide switch 22. The rotor 30 is provided with an end wall 37 which has a central aperture surrounding a central bearing 38 projecting from the cap 39. A spiral spring 40, the inner end of which is anchored on the cap plate at 34 is connected at its outer end as at 41 with the end 37 of the rotor and is so wound as to impel the rotor to a closed position perpendicular to that shown in Fig. 1. The rotor structure and the wave guide casing, as well as the sections 32 and 33, preferably consist of highly conductive material such as brass. At its opposite end, the rotor 30 is provided with an axial bearing member 42 extending through a central bearing in the cap 43 of the casing and carrying at its outer end a transverse bar 44 of magnetic material. When the key 29 is open the spiral spring 40 impels the rotor to a limiting position determined by contact of the bar 44 against an abutment 45. Supported by the casing is an enclosed electromagnetic apparatus comprising a solenoid form winding 46 provided with a central core 47 having terminal pole-pieces or magnetic shoes 48 which are positioned opposite each other at the extremities of a diameter perpendicular to that normally assumed by the bar 44 when at rest against abutment 45. Upon closure of the key 29 an energization of the winding 46 occurs. The resulting magnetomotive force between the pole-pieces 48 attracts magnetic bar 44 causing it to rotate carrying the rotor 30 along with it against reaction of the spring 40. A second abutment, not shown, serves to stop the bar 44 at a position such that the passageway through the rotor 30 will be in alignment with the passageways of the sections 32 and 33 as shown in Fig. 1. It will be apparent, therefore, that so long as the key 29 is held in closed position wave guide switch 22 will be maintained in energy transmission position as shown in Fig. 1 but that as soon as the key 29 is permitted to open, the spring 40 will impel the rotor 30 of the wave guide switch 22 to energy interrupting position.

Figure 5:
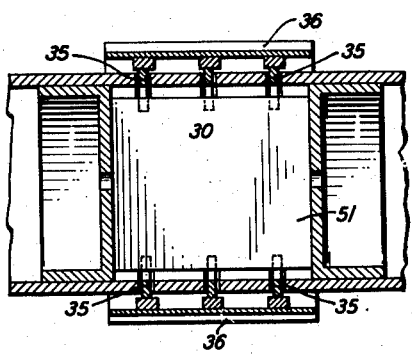
Fig. 5 is a section along the horizontal plane passing through the line 5—5 of Fig. 2.

Fig. 5 shows in section the manner in which the spring 36 impels the arcuate shoes 35 into engagement with the rotor 30.

Figure 6:
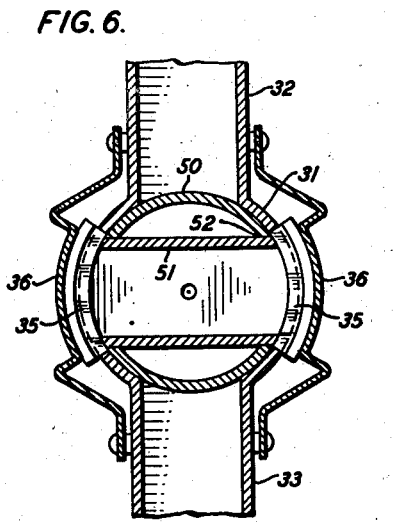
Fig. 6 is a sectional element similar to that of Fig. 1 of a member of a modified form of switch in which the valve member is formed of hollow tubing.

Fig. 6 illustrates a modification of the rotor member in which construction is simplified by constituting the rotor member of a section of brass tubing 50 through diametrically opposite slots in which a section of wave guide tubing 51 is passed and soldered or braised as at 52.

Figure 7:
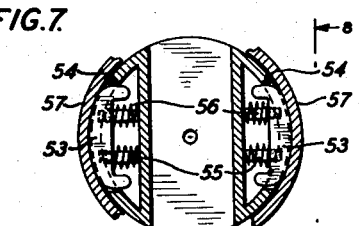
Fig. 7 is a section of a different modification in which the spring-pressed contactors for preventing leakage are mounted within the valve rotor.
Figure 8:
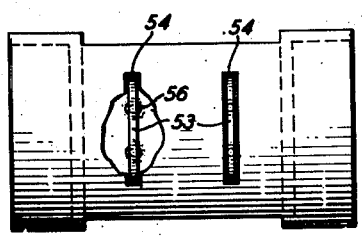
Fig. 8 is a front view of the rotor of Fig. 7 looking in the direction of the arrows from the vertical plane passing through line 8—8 of Fig. 7.

Fig. 7 illustrates a modification of the wave guide switch in which in lieu of the external springs 36 and the arcuate contactors 35, internal contactors 53 mounted within the hollow tubular rotor and projecting through slots 54 in its periphery are provided. The contactors 53 are supported by guide pins 55 integrally connected with the rotor and extending loosely into holes in the contactors. Springs 56 press the contactors 53 outwardly into engagement with the casing 57. As in the case of the arcuate members 35, the contactors 53 serve to preclude leakage past the rotor of the wave guide switch in its energy transmission position and especially in its energy interrupting position when it is particularly desirable to prevent any transmission of energy past the rotor from one wave guide section to the other.

Figure 9:
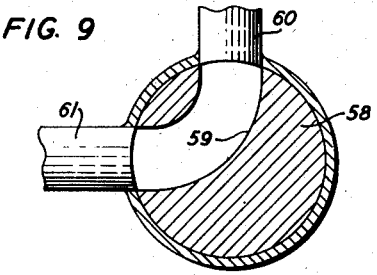
Fig. 9 illustrates diagrammatically a wave guide valve for connecting or disconnecting wave guide sections extending at right angles to each other.

Fig. 9 shows schematically a rotor 58 provided with a wave guide passageway 59 having a 90-degree turn so as to enable it to connect the wave guide sections 60 and 61 which extend in directions perpendicular to each other. As will be apparent a 45-degree rotation of the rotor 58 will enable transmission between the sections 60 and 61 to be interrupted.

Figure 10:
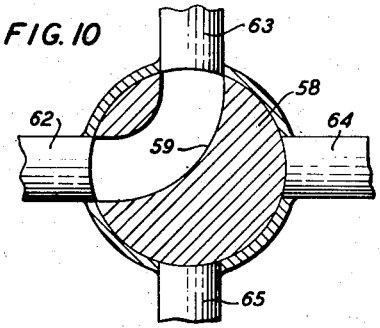
Fig. 10 is a diagrammatic showing of a wave guide switch for connecting any adjacent pair of four circularly arranged wave guides.

Fig. 10 illustrates a wave guide switch analogous to that of Fig. 9 in which any adjacent pair of the circularly arranged wave guide sections 62, 63, 64 and 65 may be connected by a rotor which is identical with that of Fig. 9. A rotation of the rotor 45 degrees will serve to disconnect all of the wave guide sections. Although not shown in either Fig. 9 or Fig. 10, it is to be understood that leakage prevention contactors similar to those disclosed in connection with the preceding figures may be employed in either of these structures.

Figure 3:
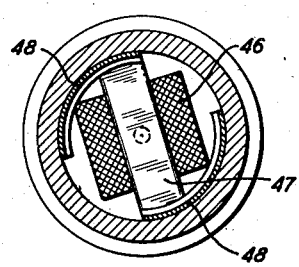
Fig. 3 is a vertical section in a plane passing through the line 3—3 of Fig. 2 looking in the direction of the arrows.
Figure 4:
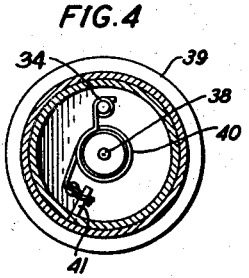
Fig. 4 is a vertical section in a plane passing through the line 4—4 of Fig. 2 looking in the direction of the arrows.
Figure 11:
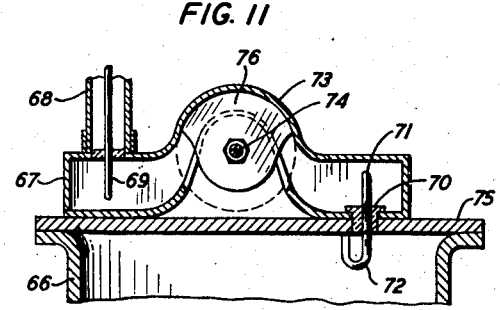
Fig. 11 is a section of a wave guide input for a cavity resonator in which a vane projectable through the wall of the wave guide serves as a cut-off switch.

Fig. 11 shows in section a portion of a cavity resonator 66, the upper end of which carries a wave guide 67. A coaxial input circuit 68 terminating in a probe coupler 69 serves to introduce energy into the wave guide section. A short coaxial section 70 provided with couplers 71 and 72 serves to couple the wave guide section to the cavity resonator. Coupler 71 is a simple half dipole or probe projecting into the wave guide 67 in the direction parallel to the shorter dimension of the wave guide and hence parallel to the electric vector of the desired oscillation field therein. Coupler 72 however, is a loop, one end of which passes thru the insulation of the coaxial section 70 to its connection with probe 71. The loop 72 lies in a plane tangential to the circular electric TE₀ vector. Its other end is electrically connected in the usual manner to the interior surface of the wave guide 67. The wave guide section 67 is of generally rectangular cross-section with its major dimension perpendicular to the plane of the paper in Fig. 11, as will be apparent from a perusal of Fig. 12 which shows a top plan view of the same structure. At its central portion the wave guide is bent upwardly and constricted as indicated at 73. Constriction is preferably of a smoothly progressive type to minimize unwanted reflection effects. Mounted beneath the constricted portion 73 on a horizontal axis 74 supported upon the top cover plate 75 of the resonator 66 by supports, not shown, is a thin flat vane 76 having such conformation that when rotated to the dotted line position it is entirely outside the wave guide 67. When the vane is rotated to the solid line position of Fig. 11 it enters through slot 77 in the constricted portion 73 of the wave guide and fits that portion closely enough to divide it effectively into two passageways each of approximately half the width of the wave guide 67. This has the effect of introducing into the wave guide a short central section operating as a high-pass structure with a cut-off considerably above the range of frequencies for which wave guide section 67 was designed. Accordingly rotation of the vane 76 to the full line position of Fig. 11 serves to enable the device to operate as an interrupted position switch thus precluding transmission from the coaxial input 68 to the cavity resonator 66 or vice versa. The vane 76 may be operated by a motor mechanism 78 controlled over a remote control circuit 79 similar in all respects to the switch actuator of Figs. 2 and 3.

Figure 12:
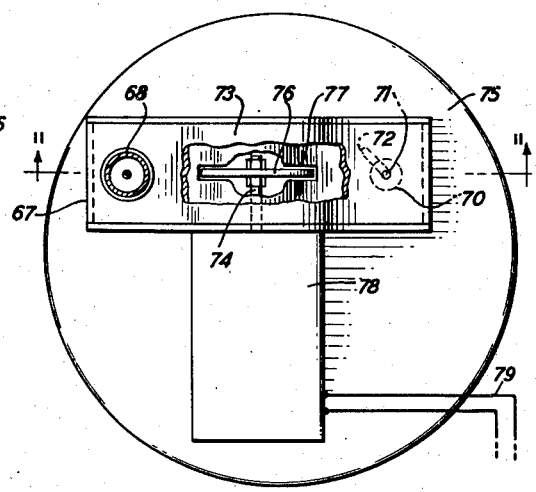
Fig. 12 is a top plane view with a portion broken away of the device illustrated in Fig. 11.
Figure 13:
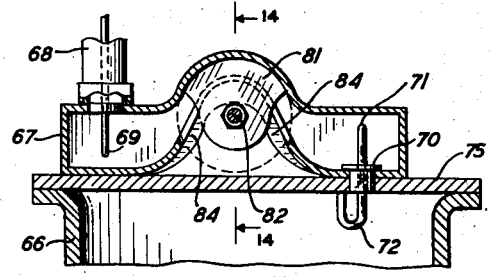
Fig. 13 is a section similar to that of Fig. 11 showing a modified form of valve involving a plurality of cut-off vanes.
Figure 14:
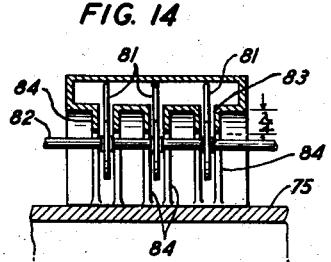
Fig. 14 is a section in a vertical plane along the line 14—14 of Fig. 13.

Figs. 13 and 14 illustrate a modification of the wave guide switch of Figs. 11 and 12 in which a plurality of vanes 81 are employed. These vanes are mounted on a common horizontal shaft 82 and enter the constricted portion of the wave guide structure through slots 83. To prevent leakage through these slots each is provided with a pair of downwardly-extending parallel aprons 84 which are separated sufficiently to permit ready access and exit of the vanes 81. These parallel aprons are arranged in pairs as indicated in Fig. 14 and are given such conformation as to cause them to operate effectively as quarter wavelength lines. The impedance of these lines to escaping oscillation energy at the slots is relatively high.

Figure 15:
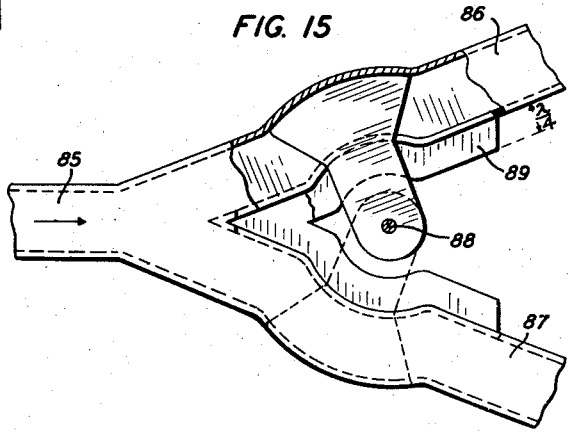
Fig. 15 illustrates a switching system in which a wave guide switch of the type illustrated in Figs. 13 and 14 is adapted to connect a main wave guide alternately to either of two branch wave guides.

Fig. 15 illustrates the application of a wave guide switch of the type shown in Figs. 13 and 14 to a Y system in which a main wave guide 85 may be connected alternately with either of two branch wave guides 86 and 87. In this structure the rotor vanes are mounted on a horizontal shaft 88 positioned in the fork between the branches 86 and 87. When the vanes are in position to project through slots in branch 86 they effectively interrupt transmission between wave guide 85 and the branch 86 while freely permitting transmission between the main guide 85 and the branch 87. In the dotted line position energy transmission is established between sections 85 and 86 but interrupted between sections 85 and 87. The expedient of quarter wavelength aprons is employed in this structure as in that of Figs. 13 and 14 to preclude leakage of oscillation energy.

What is claimed is:

1. A wave guide switch comprising a switch housing physically connected between two longitudinally aligned hollow tubular wave guide sections having equal interior cross-sections and having a cylindrical opening through said housing extending in a direction transverse to the wave guide sections, a valve comprising a solid cylinder of conducting material closely fitting into said cylindrical opening and having a transverse opening of the same cross-section as the interior of the tubular wave guide sections so that upon turning the cylinder to the correct position the transverse opening aligns with the wave guide sections to constitute a smooth uninterrupted wave guide, leakage prevention means in the space between said switch housing and said valve, said means comprising a substantially flat conductive partition disposed radially with reference to the central axis of the valve and extending substantially the entire distance between the housing and the valve, whereby the partition is parallel to the direction of propagation of leakage waves in said space and the cut-off frequencies of the resulting subdivisions of the said space as wave guides are materially higher than the cut-off frequency of the undivided space, means normally holding said cylinder rotated to such a position as to wholly interrupt the wave guide path and remote controlled means to rotate the cylinder to the open position of the valve.

2. A wave guide switch comprising a tubular section, a central portion of the section being rotatable about an axis perpendicular to the longitudinal axis of the tubular section and having walls which serve when said portion is rotated to effectively close the section at both sides of the central portion, and a substantially flat conductive partitioning element mounted in the wall of said central portion and disposed radially with reference to the axis of rotation to preclude transmission leak past said central portion when in the closed position.

3. A wave guide switch comprising a section of tubular wave guide, a central portion of said section having a cylindrical conformation with the axis of the cylinder transverse to that of the tubular wave guide and mounted for rotation about its axis to interrupt the guide upon rotation about the axis, said central portion fitting closely between the outer portions of the section and means projecting through a slot in an outer portion of said section to bear against the cylindrical portion.

4. A wave guide switch comprising a structure having a tubular passageway therethrough serving as a wave guide, a central section of the structure through which the passageway passes having a cylindrical configuration with its cylindrical axis transverse to the passageway, said central section being mounted for rotation about said axis to interrupt the passageway and means mounted on the structure and projecting therethrough into contact with the central section to divide up the narrow guideways caused by imperfect contact at both sides of the cylindrical member when the member is rotated to the interrupting position.

5. A wave guide switch comprising a structure having a tubular wave guide passageway extending therethrough, a cylindrical central section the cylindrical axis of which is transverse to the passageway, means for rotating the central section about its cylindrical axis to interrupt the passageway and leakage prevention partitioning means comprising substantially flat conductive elements radially disposed with reference to the said cylindrical axis to preclude transmission leak through any minute passageway extending around either side of the cylindrical section occasioned by lack of perfect fit of the cylindrical section.

6. A wave guide switch comprising a structure having a tubular passageway therethrough, a central section thereof of cylindrical conformation with its cylindrical axis transverse to the passageway and mounted for rotation about the cylindrical axis, the passageway normally passing through the central section and thin resilient partitioning means mounted within the central section and pressing outwardly to divide up any leakage guide path existing around either side of said central section when it is rotated.

7. In combination, a plurality of wave guide sections, wave guide transducing means coupling said sections to each other and including a member movable with respect thereto to occupy a transmitting position and an interrupting position, said means with said member in the transmitting position presenting a continuous wave guide path from one contiguous section to another substantially free from reflecting discontinuities and in the interrupting position effectively serving to block wave energy transmission from the one section to the other, said movable member including at least one substantially flat partitioning element mounted circumferentially thereon and disposed parallel to the direction of a transmission leak path around said movable member.

8. In combination, a plurality of wave guide sections of similar contour, wave guide transducing means coupling said sections to each other to permit wave energy to pass freely therebetween or to interrupt the passage of wave energy at will, said means including a movable member having a wave guide path therethrough and movable into registration with the contiguous sections to present a path connecting one contiguous section to another and substantially free from reflecting discontinuities, said member being also movable to completely interrupt the passage of wave energy from one of the contiguous sections to the other, and including vane-like conductive contacting elements circumferentially mounted thereon to preclude transmission leak past said movable member.

9. In combination, a plurality of tubular wave guide members having passageways therethrough of similar contour, a wave guide transducing member coupling said tubular members to each other, said tubular members and said transducing member being mounted in contiguous relation to permit wave energy to pass freely from one tubular member to another through the transducing member or to be interrupted by the transducing member at will, said transducing member having an opening therethrough of the same cross-section as said tubular members whereby in one position of the transducing member there is constituted a continuous smooth passageway of uniform cross-section substantially free from leakage apertures and from reflecting discontinuities and in another position of the transducing member the passageway between the tubular members is completely interrupted, and leakage prevention means at the contact surfaces of said tubular members and said transducing member mounted on said members to divide up any leakage aperture which may tend to exist at their junction so as to partition that aperture into smaller apertures and to render it effectively incapable of permitting leakage therethrough of oscillations of the lowest frequency of the normal frequency transmission range of the tubular members.

10. A wave-guide comprising a hollow cylindrical housing having a plurality of tubular wave-guide sections connected thereto, a rotatable central closure member fitting into said housing and having a transverse opening therethrough to constitute a passageway in a transmitting position and an interrupted path in a non-transmitting position, and leakage prevention means comprising at least one vane-like partitioning arcuate segment disposed circumferentially between the walls of said housing and said closure member and radially with reference to the axis of rotation of said rotatable central closure member to subdivide any leakage path existing therebetween.

WALTER F. KANNENBERG.

REFERENCES CITED

The following references are of record in the file of this patent:

UNITED STATES PATENTS

| Number | Name | Date |
|---|---|---|
| 661,510 | Fondu | Nov. 13, 1900 |
| 1,569,285 | Katona | Jan. 12, 1926 |
| 2,129,712 | Southworth | Sept. 13, 1938 |
| 2,396,044 | Fox | Mar. 5, 1946 |
| 2,415,242 | Hershberger | Feb. 4, 1947 |
| 2,423,130 | Tyrrell | July 1, 1947 |
| 2,423,508 | Leck | July 8, 1947 |
| 2,426,186 | Dow | Aug. 26, 1947 |
| 2,427,940 | Ayres | Sept. 23, 1947 |
| 2,454,761 | Barrow | Nov. 30, 1948 |

OTHER REFERENCES

Meagher and Markley "Practical Analysis of Ultra High Frequency," published by RCA Service Co., Inc., Camden, N. J. August 1943, page 17. 178-1D